United States Patent
Damron

[19]
[11] Patent Number: 6,102,422
[45] Date of Patent: Aug. 15, 2000

[54] RETRACTABLE TRAILER HITCH GUIDE

[76] Inventor: Charles C. Damron, 422 Roosevelt La., Desert Aire, Wash. 99349

[21] Appl. No.: 08/958,629

[22] Filed: Oct. 27, 1997

[51] Int. Cl.[7] .................................................. B60D 13/00
[52] U.S. Cl. .............................................................. 280/477
[58] Field of Search ................................... 280/477, 508, 280/511, 479.3, 482, 478.1, 478.2, 504, 491.1

[56] References Cited

U.S. PATENT DOCUMENTS

| | | | |
|---|---|---|---|
| 929,920 | 8/1909 | Davis . | |
| 4,254,968 | 3/1981 | Del Vecchio | 280/477 |
| 4,991,865 | 2/1991 | Francisco | 280/477 |
| 5,236,215 | 8/1993 | Wylie | 280/477 |
| 5,277,446 | 1/1994 | Hamel | 280/477 |
| 5,529,330 | 6/1996 | Roman | 280/477 |
| 5,797,616 | 8/1998 | Clement | 280/477 |

*Primary Examiner*—Christopher P. Schwartz
*Assistant Examiner*—C. T. Bartz
*Attorney, Agent, or Firm*—Liebler, Ivey & Connor; Floyd E. Ivey; Lori-Anne M. Mooney

[57] ABSTRACT

A trailer hitch guide with a retractable yoke assembly. The yoke assembly presents, at its yoke end, a vee shaped receptacle to receive and guide a trailer hitch ball into contact with a trailer hitch. The yoke assembly yoke end is formed of at least one yoke guide, which positions the yoke assembly, received into at least one yoke guide receiver tube. The yoke end, in the preferred embodiment, is composed of a first and second yoke guide which are received respectively into the first and second yoke guide receiver tubes. A plate assembly is composed of a plate and a yoke guide receiver tube is affixed to either side of a trailer hitch tongue with each sized to receive a yoke guide. The yoke assembly is extended, when positioned to receive and guide a trailer hitch ball for connection with a trailer hitch, and fixed into the extended position by means including one or more pins. The yoke assembly is retracted, during trailer transit, with the yoke guides being retracted into the yoke guide receiver tubes and fixed with means including one or more pins.

14 Claims, 7 Drawing Sheets

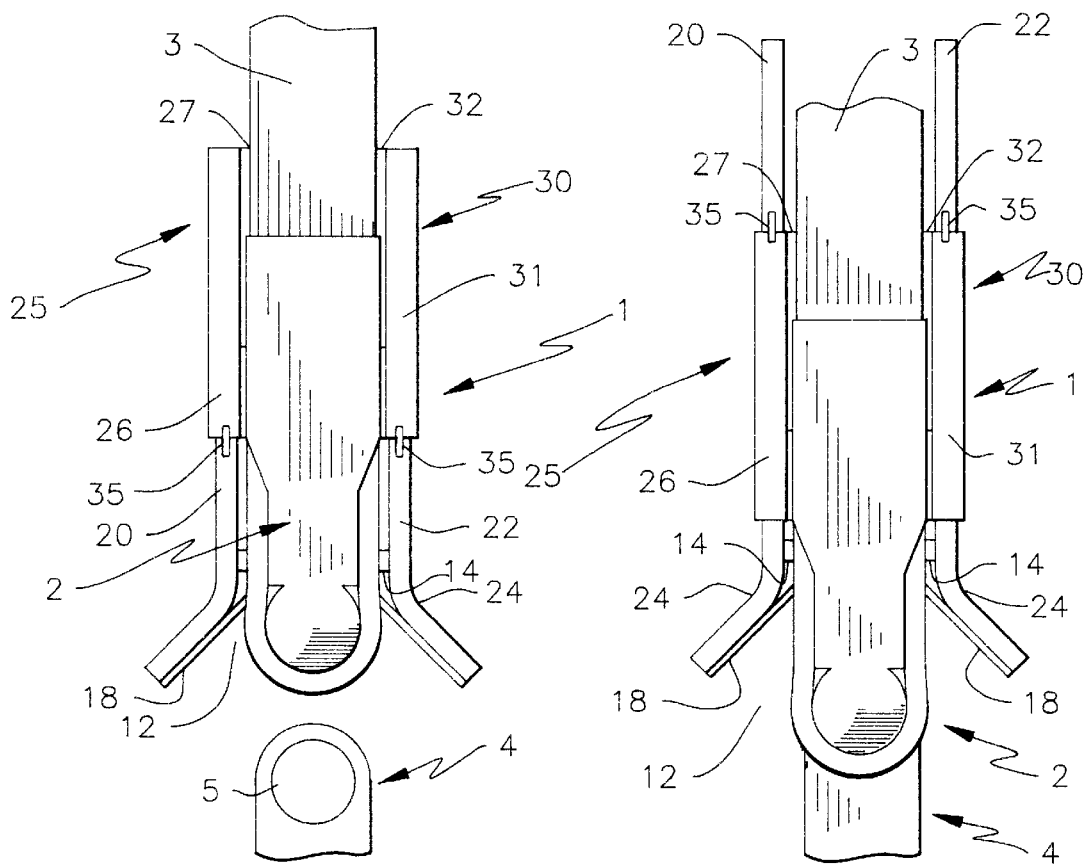
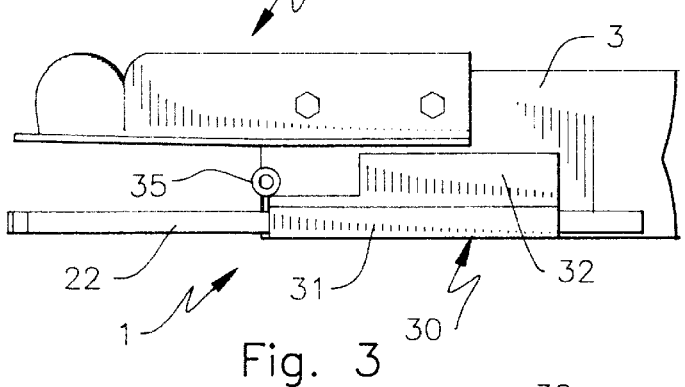
Fig. 1  Fig. 2
Fig. 3
Fig. 4

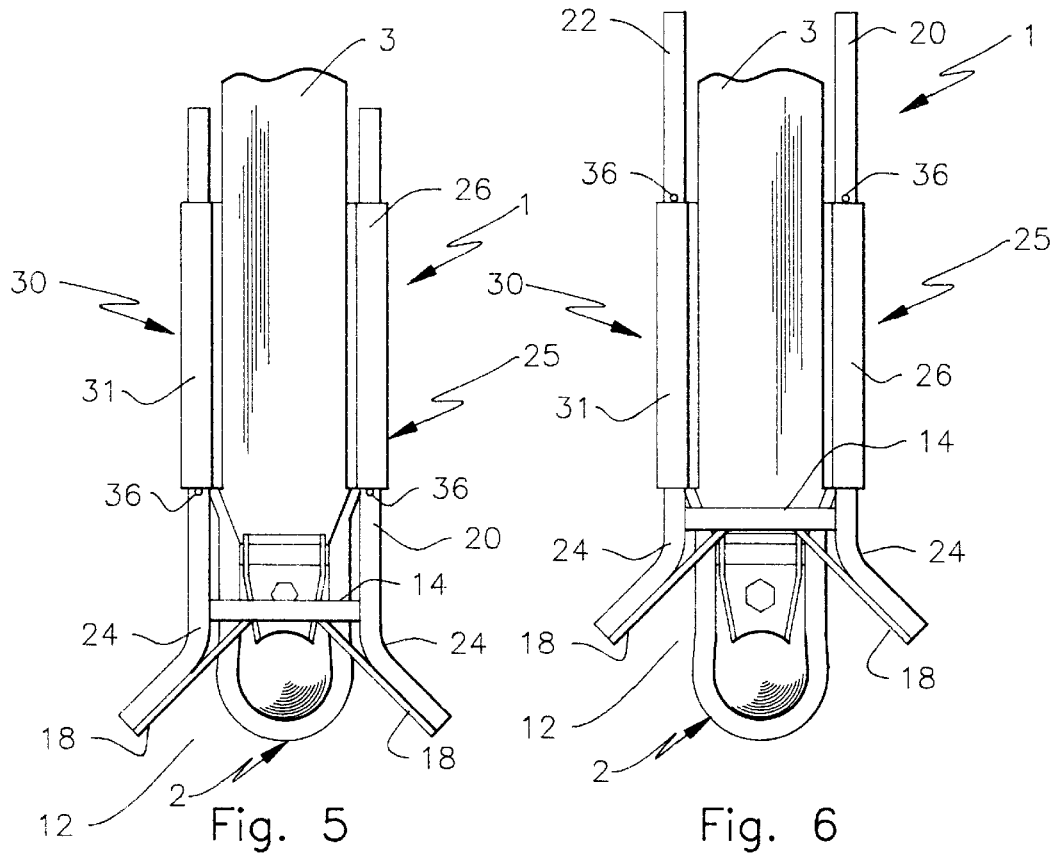
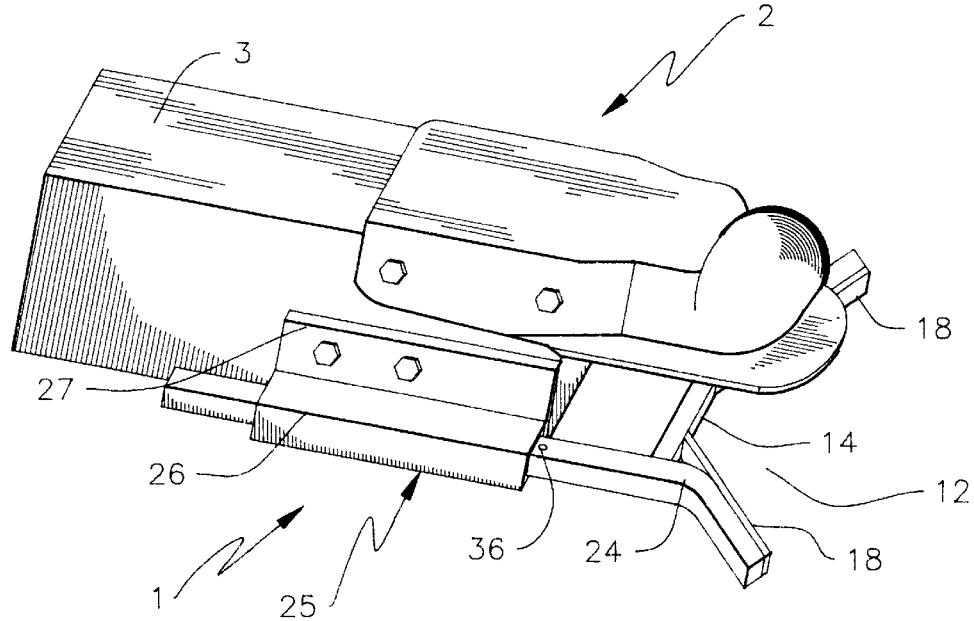
Fig. 5  Fig. 6  Fig. 7

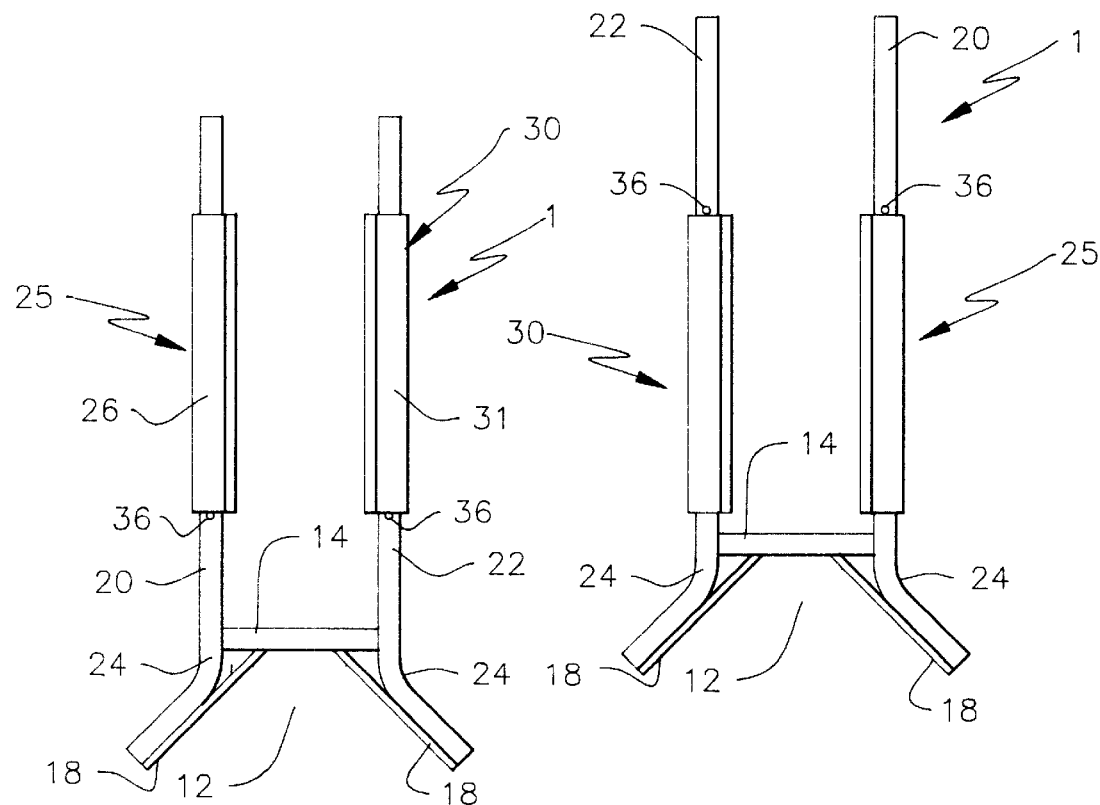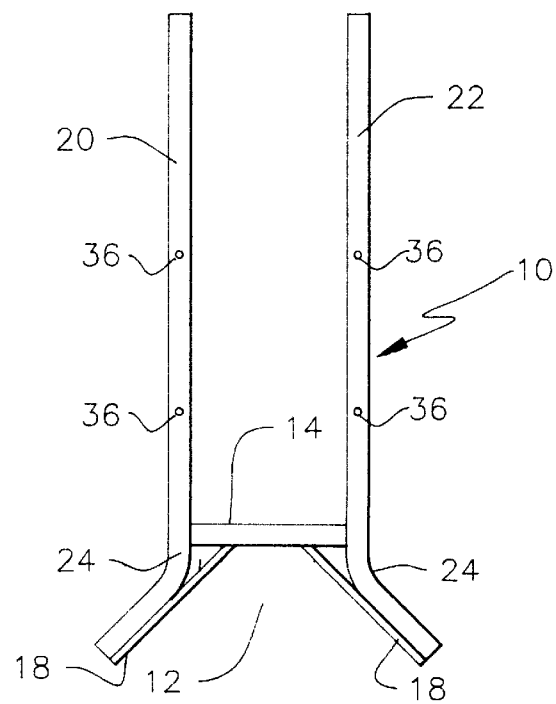

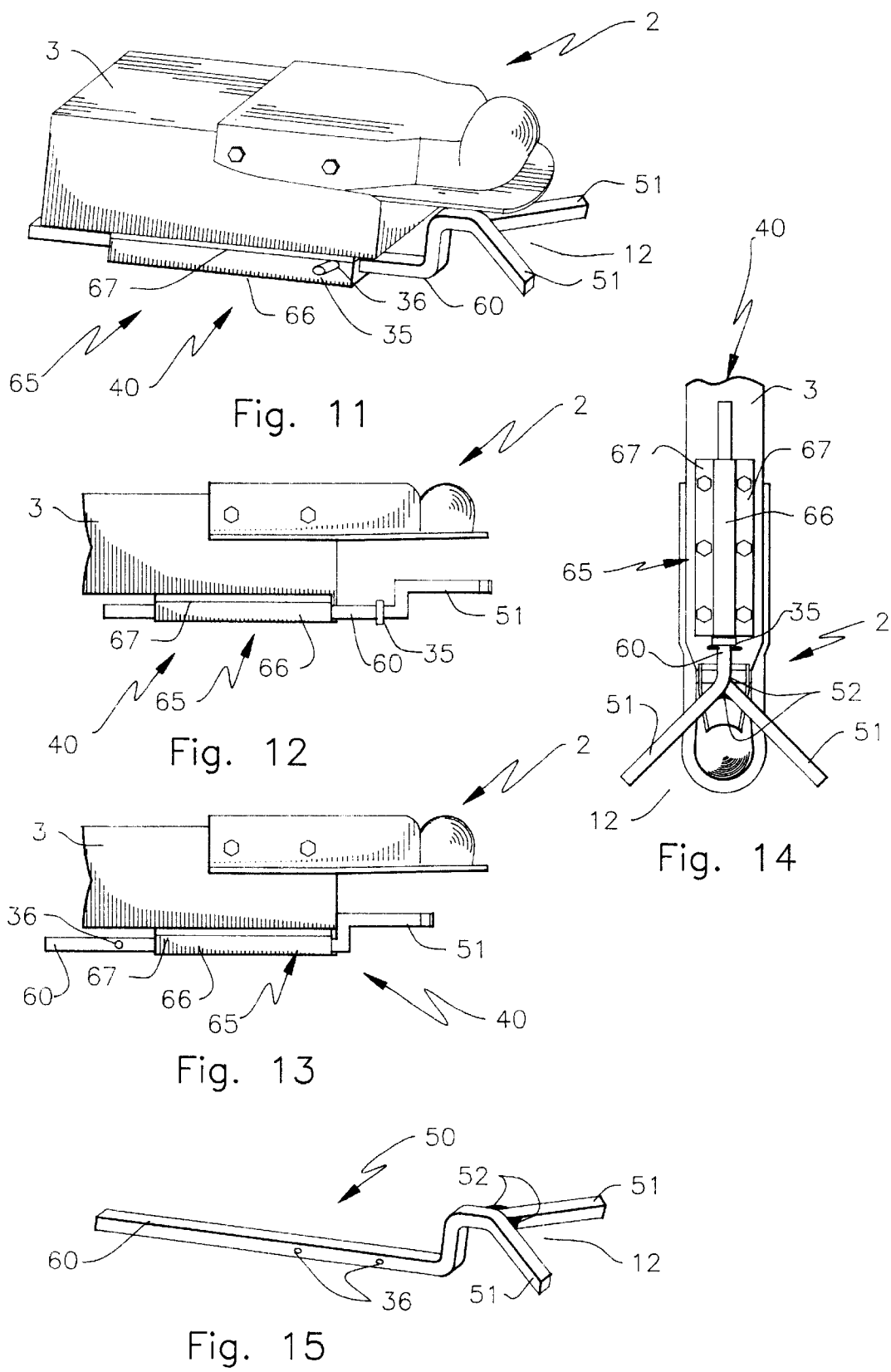

RETRACTABLE TRAILER HITCH GUIDE

FIELD OF THE INVENTION

The present invention relates generally to the means of locating or positioning a trailer hitch for mating the trailer hitch with a trailer hitch ball and particularly to an apparatus which engages the trailer hitch ball and guides the ball into the correct position for ease in connecting a trailer hitch to the trailer hitch ball.

BACKGROUND OF THE INVENTION

A variety of apparatus' are known in the prior art which are directed toward easing the hitching of a trailer hitch to a trailer hitch ball. U.S. Pat. No. 4,254,968 to DelVecchio discloses a guide attachment which is used during the hitching activity and removed during transit. U.S. Pat. No. 5,236,215 to Wylie demonstrates a pin attached to the trailer hitch which is directed by a guide apparatus to a trailer hitch ball. U.S. Pat. No. 929,920 to Davis shows a vee shaped guide with a spring actuated pin mechanism. U.S. Pat. No. 5,277,446 to Hamel illustrates a rigid elongate bar mounted at the tongue post below the frame where the elongate bar is extended and attached with a ring to a trailer hitch ball; the elongate bar is pulled with a winch to position a trailer hitch for ultimate connection to the trailer hitch ball. U.S. Pat. No. 4,991,865 to Francisco discloses a telescoping trailer hitch assembly which mates with a pin fixed hitch upon extension and which must be compressed and bolted into place for transit. The patents referred to herein are provided herewith in an Information Disclosure Statement in accordance with 37 CFR 1.97.

SUMMARY OF THE INVENTION

The present invention discloses the use of a trailer hitch guide with an extendable and retractable yoke assembly. The retractable trailer hitch guide is affixed, in the preferred embodiment, to the trailer hitch tongue. A side plate assembly provides the means of mounting and guiding the elements of the retractable trailer hitch guide. The side plate assembly in the preferred embodiment is composed of a side plate, provided for example by a ¼"×2"×7" mild steel plate or the equivalent, to which is affixed by means, including for example riveting and welding, a yoke guide receiver tube. The side plate assembly may be formed from standard metal forming techniques including, for example, the mentioned fabrication process, stamping, forging and other metal forming processes. The side plate provides the structure for attachment of the side plate assembly by means, including for example bolting and welding, to the tongue. A yoke assembly provides the guide function of directing a trailer hitch ball for positioning with a trailer hitch. The yoke assembly presents, at its yoke end, a vee shaped receptacle to receive and guide a trailer hitch ball into contact with a trailer hitch. The yoke assembly has at least one yoke guide and in the preferred embodiment a first and second yoke guide. The yoke guide received into and hence positioned by the yoke guide receiver tube. The yoke guide receiver tube is sized and shaped to receive the yoke guide and is positioned to correctly cause the yoke end to intercept a trailer hitch ball. The yoke assembly is extended and retained in place by means, for example by one or more pins, during the connection of the trailer hitch to the trailer hitch ball and is retracted into the yoke guide receiver tube and retained therein during transit by means, including for example by one or more pins. The yoke assembly may be formed from standard metal forming techniques including, for example, a fabrication process, stamping, rolling, forging and other metal forming processes.

BRIEF DESCRIPTION OF THE DRAWINGS

The foregoing and other features and advantages of the present invention will become more readily appreciated as the same become better understood by reference to the following detailed description of the preferred embodiment of the invention when taken in conjunction with the accompanying drawings, wherein:

FIG. 1 is a top plan view of the retractable trailer hitch guide with the yoke assembly extended for receiving and guiding a trailer hitch ball for connection with a trailer hitch.

FIG. 2 is a top plan view of the retractable trailer hitch guide with the yoke assembly retracted as during transit and following the positioning of a trailer hitch ball for connection with a trailer hitch.

FIG. 3 is a side elevation of the retractable trailer hitch guide showing the side plate assembly with side plate and yoke guide receiver tube; the yoke assembly is depicted with the yoke end revealed extended for receiving and guiding a trailer hitch ball for connection with a trailer hitch; the yoke guide is received into the yoke guide receiver tube.

FIG. 4 is a side elevation of the retractable trailer hitch guide showing the side plate assembly with side plate and yoke guide receiver tube; the yoke assembly is depicted with the yoke end revealed in the retracted state into the yoke guide receiver tube as used during transit and following guiding a trailer hitch ball for connection with a trailer hitch; the yoke guide is retracted into the yoke guide receiver tube.

FIG. 5 is a bottom plan view of the retractable trailer hitch guide with the yoke assembly extended for receiving and guiding a trailer hitch ball for connection with a trailer hitch.

FIG. 6 is a bottom plan view of the retractable trailer hitch guide with the yoke assembly retracted as during transit and following the positioning of a trailer hitch ball for connection with a trailer hitch.

FIG. 7 is a perspective view of the retractable trailer hitch guide showing the side plate assembly with side plate and yoke guide receiver tube; the yoke assembly is depicted with the yoke end revealed extended for receiving and guiding a trailer hitch ball for connection with a trailer hitch; the yoke guide is received into the yoke guide receiver tube.

FIG. 8 is a top plan view of the retractable trailer hitch guide shown separate from the hitch; depicted are the first and second side plate assembly with first and second side plates and first and second yoke guide receiver tubes; the yoke assembly is depicted in the extended state showing the yoke end, yoke cross brace, and yoke face plates; the first and second yoke guides are shown received into the first and second yoke guide.

FIG. 9 is a top plan view of the retractable trailer hitch guide shown separate from the hitch; depicted are the first and second side plate assembly with first and second side plates and first and second yoke guide receiver tubes; the yoke assembly is depicted in the retracted state showing the yoke end, yoke cross brace, and yoke face plates; the first and second yoke guides are shown received into the first and second yoke guide.

FIG. 10 is a top plan view of the yoke assembly; the yoke assembly is depicted showing the yoke end, yoke cross brace, and yoke face plates; the first and second yoke guides are shown.

FIG. 11 is a perspective view of demonstrating an additional embodiment as an alternative retractable trailer hitch guide showing the alternative plate assembly with alternative plate and alternative yoke guide receiver tube; the alternative yoke assembly is depicted with the yoke end revealed extended for receiving and guiding a trailer hitch ball for connection with a trailer hitch; the yoke guide is received into the alternative yoke guide receiver tube.

FIG. 12 is a side elevation of the alternative retractable trailer hitch guide showing the alternative plate assembly with alternative plate and alternative yoke guide receiver tube; the alternative yoke assembly is depicted with the yoke end revealed extended for receiving and guiding a trailer hitch ball for connection with a trailer hitch; the yoke guide is received into the yoke guide receiver tube.

FIG. 13 is a side elevation of the alternative retractable trailer hitch guide showing the alternative plate assembly with alternative plate and alternative yoke guide receiver tube; the alternative yoke assembly is depicted with the yoke end retracted as during transit; the yoke guide is received into the yoke guide receiver tube.

FIG. 14 is a bottom plan view of the alternative retractable trailer hitch guide with the alternative yoke assembly extended for receiving and guiding a trailer hitch ball for connection with a trailer hitch; the alternative plate assembly is depicted as affixed to a tongue with alternative yoke guide receiver tube affixed to the alternative plate; the yoke guide is received into the alternative yoke guide receiver tube.

FIG. 15 is a perspective view of the alternative yoke assembly; the alternative yoke assembly is depicted showing the yoke end, and alternative yoke guide; yoke arms are depicted at the yoke end forming a vee shape; means including welding affixes at least one yoke arm to the alternative yoke assembly.

DETAILED DESCRIPTION

Figure 16:
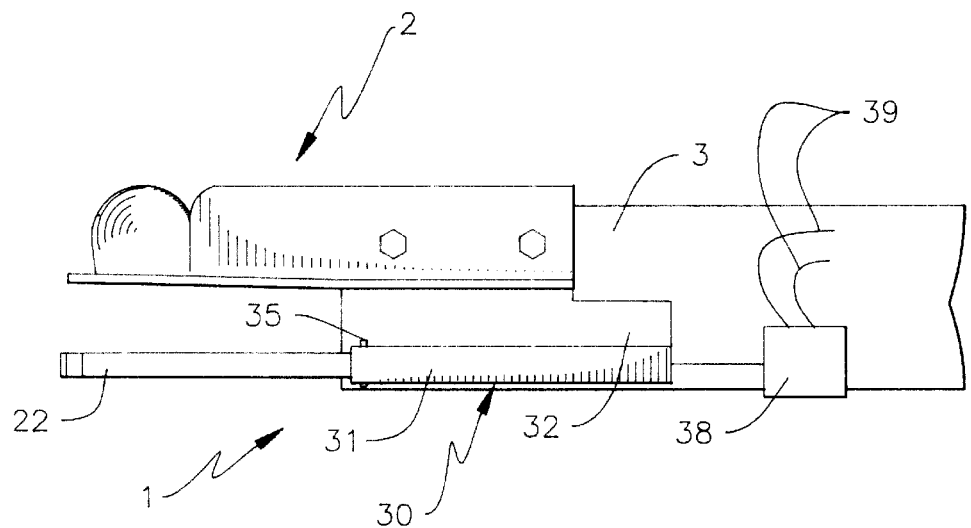
FIG. 16 is a side elevation of the of the retractable trailer hitch guide showing a means of extending and retracting the yoke assembly by use of an actuator, connected by means to the yoke assembly, having control and power sources.

A principal objective of the retractable trailer hitch guide is to ease the connection of a trailer hitch ball with a trailer hitch assembly. Another focal objective is the disclosure of an apparatus which is formed from readily available materials requiring little manufacturing effort or processes. An additional feature of the invention is to provide such an apparatus at a cost and with such simplicity as to make affordable the installation of the disclosed invention on each trailer thus obviating the purpose of prior art in being used temporary on many different trailers. The overriding advantages experienced from this invention are the unexpected ease, in comparison to prior art, in utilization; the simplicity of construction and installation when compared with prior art; the options of permanent installation with ease of removal of the yoke assembly for storage in the vehicle when the trailer is disconnected; the protection to unwanted removal, as through theft, when the trailer is connected by reason of the yoke assembly encountering the trailer hitch ball upon attempted removal and the reduced expense of the apparatus as required for manufacturing and production of the apparatus.

The preferred embodiment of the retractable trailer hitch guide 1 is a shown in FIGS. 1 through 10. FIGS. 1 through 7 show the retractable trailer hitch guide 1 installed or affixed to a trailer hitch tongue 3. Side plate assemblies identified here as first and second side plate assemblies 25, 30 and are composed of a first and second side plate 27, 32 to which first and second yoke guide receiver tubes 26, 31 are respectively affixed by means, including for example bolting and welding. The first and second side plate assemblies 25, 30 are affixed by means, including for example bolting or welding, to the tongue 3. An alternative form of the side plate assembly is demonstrated in FIG. 18 wherein the equivalent of a first side plate assembly 25 is shown having a first side plate 27 and a first yoke guide receiver 26 as it may appear when formed from a stamping or other metal forming process.

A yoke assembly 10 has a yoke end 12 and at least one yoke guide which positions the yoke assembly 10 by being received into and guided by at least one yoke guide receiver tube. The yoke assembly 10, in the preferred embodiment, is composed of a first and second yoke guide 20, 22 which are joined by a bracing means, provided for example in the preferred embodiment by a yoke cross brace 14 affixed by means, including for example by bolting, riveting or welding or such equivalent to each of the first and second yoke guides 20, 22. The first and second yoke guides 20, 22 are sized and received respectively into first and second yoke guide receiver tubes 26, 31. The first and second side plate assemblies 25, 30 are fixed to the tongue 3 in an orientation which causes the yoke end 12 to intercept and guide the trailer hitch ball 5 for connection with the trailer hitch assembly 2. The yoke assembly 10 is extended from the first and second yoke guide receiver tubes 26, 31, when positioned to receive and guide a trailer hitch ball 5 for connection with a trailer hitch assembly 2, and fixed into the extended position by means including, for example pins, bolts and the equivalent, and provided for in the preferred embodiment by one or more pins 35 received through pin apertures 36 through the first and second yoke guides 20, 22 and first and second yoke guide receiver tubes 26, 31. The yoke assembly 10 is retracted by insertion of the first and second yoke guides 20, 22 into the first and second yoke guide receiver tubes 26, 31, during trailer transit, and fixed into the retracted position by means including, for example pins, bolts and the equivalent, and provided for in the preferred embodiment by one or more pins 35 received through pin apertures 36 through the first and second yoke guides 20, 22 and first and second yoke guide receiver tubes 26, 31. Fixing the position of the yoke assembly 10 with pins is demonstrated in FIGS. 1 through 10. The yoke assembly 10 is shown in the extended position in FIGS. 1, 3, 5, 7 and 8 and in the retracted positions in FIGS. 2, 4, 6 and 9.

The yoke assembly 10 in the preferred embodiment is formed by joining first and second yoke guide 20, 22 members. The first and second yoke guide 20, 22 member, in the preferred embodiment, is formed of mild steel square cross-section re-bar. Each of the first and second yoke guide 20, 22 members is formed with a bend 24 so that the joining of the first and second yoke guide 20, 22 with a bracing member seen in the preferred embodiment as a cross brace 14, causes the formation at a yoke end 12 of a vee shape intended to receive and guide a trailer hitch ball 5 for connection to a trailer hitch assembly 2. Additional structural strengthening may be provided by the addition of yoke face plates 18 affixed by means to the portion of the first and second yoke guides 20, 22 forming the vee at the yoke end 12 which will contact the trailer hitch ball 5. Such yoke face plates 18 may additionally be fixed, for example by welding or bolting, to a bracing member such as the cross-brace 14. The yoke assembly may be formed from standard metal forming techniques including, for example, a fabrication process, stamping, forging and other metal forming processes.

The yoke assembly 10, in the preferred embodiment, is extended and retracted manually. Alternate means may be provided by use of power operated actuator 38 means where by powered means a shaft is extended and retracted from the actuator with the shaft attached by means to the yoke assembly. Actuator 38, actuator control and power sources 39 including for example electric, hydraulic and pneumatic are depicted in FIG. 16.

Figures 18, 19:
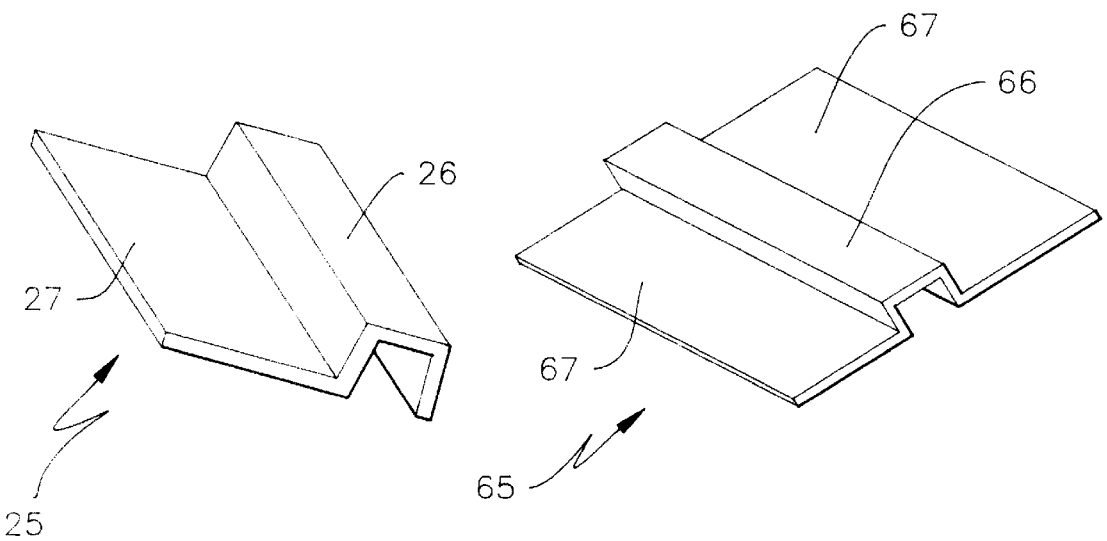
FIG. 18 is a perspective view of a side plate assembly formed by a stamping or metal forming process as an alternative to the first and second plate assemblies shown in FIGS. 1 through 9.
FIG. 19 is a perspective view of an alternative plate assembly formed by a stamping or metal forming process as an alternative to the alternative plate assemblies shown in FIGS. 11 through 14.

Additional embodiments of the retractable trailer hitch guide 1 may be envisioned which permit yoke assemblies with yoke guides and yoke guide receiver tubes of configuration differing from those depicted in the preferred embodiment. An additional embodiment is depicted, as an example of different configurations possible, in FIGS. 11 through 15. FIGS. 11 through 14 show an alternative retractable trailer hitch guide 40 installed or affixed to a trailer hitch tongue 3. Alternative plate assemblies 65 are composed of an alternative plate 67 to which an alternative yoke guide receiver tube 66 is affixed by means, including for example bolting and welding. The alternative plate assembly 65 is affixed by means, including for example bolting or welding, to the tongue 3. The alternative plate assembly may as well be formed from a single piece of sheet metal, mild steel or other suitable stock in a stamping or other metal forming process as shown in FIG. 19.

An alternative yoke assembly 50 has a yoke end 12 comprised of at least a pair of yoke arms 51 and at least one alternative yoke guide 60 which positions the alternative yoke assembly 50 by being received into and guided by at least one alternative yoke guide receiver tube 66. The alternative yoke assembly 50, in this alternative embodiment, is composed of an alternative yoke guide 60 which has a yoke end 12 formed by at least two yoke arms 51. The shape of the alternative yoke assembly 50 is accomplished by standard metal forming processes. One or more of the yoke arms 51 may be formed by form bending or by affixing by means to the alternative yoke assembly 50 for example by welding. The alternative yoke assembly may as well be formed from a single piece of sheet metal, mild steel or other suitable stock in a stamping or other metal forming process.

Figure 17:
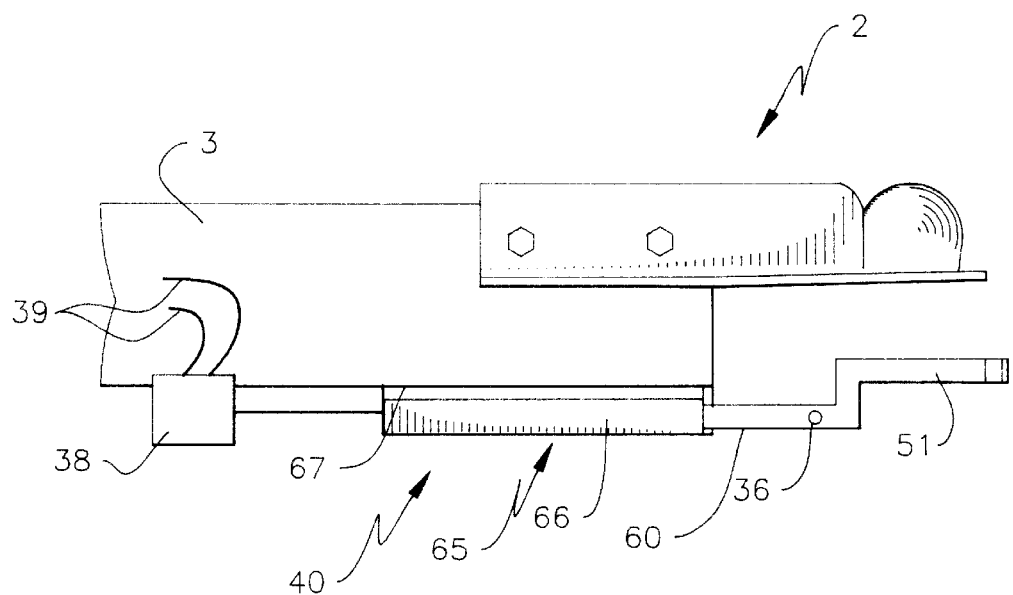
FIG. 17 is a side elevation of the of the alternative retractable trailer hitch guide showing a means of extending and retracting the alternative yoke assembly by use of an actuator, connected by means to the yoke assembly, having control and power sources.

The alternative yoke guide 60 is sized and received respectively into the alternative yoke guide receiver tube 66. The alternative plate assembly 65 is fixed to the tongue 3 in an orientation which causes the yoke end 12 to intercept and guide the trailer hitch ball 5 for connection with the trailer hitch assembly 2. The alternative yoke assembly 50 is extended from the alternative yoke guide receiver tube 66 when positioned to receive and guide a trailer hitch ball 5 for connection with a trailer hitch assembly 2, and fixed into the extended position by means including, for example pins, bolts and the equivalent, and provided for in this alternative embodiment by one or more pins 35 received through pin apertures 36 through the first and second yoke guides 20, 22 and first and second yoke guide receiver tubes 26, 31. The alternative yoke assembly 50 is retracted by insertion of the alternative yoke guide 60 into the alternative yoke guide receiver tube 66, during trailer transit, and fixed into the retracted position by means including, for example pins, bolts and the equivalent, and provided for in this alternative embodiment by one or more pins 35 received through pin apertures 36 through the first and second yoke guides 20, 22 and first and second yoke guide receiver tubes 26, 31. Fixing the position of the alternative yoke assembly 50 with pins is demonstrated in FIGS. 11 through 14. The alternative yoke assembly 50 is shown in the extended position in FIGS. 11, 12 and 14 and and in the retracted positions in FIG. 13. The alternative yoke assembly 50 is depicted in FIG. 15. Means for extending and retracting the alternative yoke assembly 50 alternative to manual positioning is depicted in FIG. 17. FIG. 17 depicts actuator 38 means provided by powered means the extension and retraction of a shaft from the actuator with the shaft attached by means to the yoke assembly. Actuator 38, actuator control and power sources 39 including for example electric, hydraulic and pneumatic are depicted in FIG. 17. Power sources for such alternative positioning may be for example electric, hydraulic or pneumatic.

The yoke assembly 10 in the preferred embodiment is formed by joining first and second yoke guide 20, 22 members. The first and second yoke guide 20, 22 member, in the preferred embodiment, is formed of mild steel square cross-section re-bar. Each of the first and second yoke guide 20, 22 members is formed with a bend 24 so that the joining of the first and second yoke guide 20, 22 with a bracing member seen in the preferred embodiment as a cross brace 14, causes the formation at a yoke end 12 of a vee shape intended to receive and guide a trailer hitch ball 5 for connection to a trailer hitch assembly 2. Additional structural strengthening may be provided by the addition of yoke face plates 18 affixed by means to the portion of the first and second yoke guides 20, 22 forming the vee at the yoke end 12 which will contact the trailer hitch ball 5. Such yoke face plates 18 may additionally be fixed, for example by welding or bolting, to a bracing member such as the cross-brace 14.

The retractable and alternative retractable trailer hitch guides 1, 40 are principally directed to boat trailers. Reasonable variations in the structures may be accomplished which will not go beyond this disclosure and claims which will accommodate other trailers including, but not limited to, for example recreational vehicles and horse trailers. The present disclosures may be simply formed using easily obtained materials, including sheet metal and mild steel, requiring little fabrication, metal forming or other manufacturing steps. The preferred embodiment of the retractable trailer hitch guide 1 may be composed of 9 pieces of metal, 2 bolts, 2 pins and paint or other coating. The yoke assembly 10, in the preferred embodiment, may be formed as follows: the first and second yoke guides 20, 22 may be formed, for example, from two ½" square cross section mild steel bars 16" long with a bend 24 approximately 2½" from the yoke end 12 at a 45 degree angle; the yoke cross brace 14 may be formed from ½" square cross section mild steel bar stock approximately 6" long or essentially the width of a tongue 3 plus the width of the first and second yoke guides 20, 22; the yoke cross brace 14, on receiver type hitches, can be welded approximately 1" distal the yoke end 12 and the 45 degree bend 24 for boats 18 feet or longer; the yoke face plate 18 may be formed from two ⅛"×½"×3" sheet metal or mild steel plates welded to the portions of the first and second yoke guides 20, 22 forming the yoke end 12 portion to contact the trailer hitch ball 5 to the yoke cross brace 14 to form a vee shape. The configuration described when formed from the materials inventoried will result in the yoke face plates 18 being welded to the yoke cross brace 14 leaving approximately one inch left centrally located on the yoke cross brace 14. This design will allow up to a 90 degree turn for the towing vehicle. For smaller boats and bumper hitches the yoke cross brace 14 can be moved more proximal the bend 24 and may be made from ¼"×½" inch stock thereby increasing the yoke assembly 10 retractable distance by approximately an additional inch.

The first and second side plate assemblies 25, 30 may be formed from a first and second side plates 27, 32 composed of sheet metal or mild steel ¼"×2"×7"; the 7" length is optional depending on the material strength required to operate under the forces exerted when trailers with loads of two or three or more tons are operated; the first and second yoke guide receivers 26, 31 may be formed from square tubing sized to receive the first and second yoke guides 20, 22; the square tubing for the preferred embodiment will accommodate ½" square bars and may be 7" long and affixed to the first and second side plates 27, 32 by welding; pin apertures 36 may be drilled through the first and second yoke guide receiver tubes 26, 31 approximately ½" distal the portion of the first and second yoke guide receiver tubes 26, 31 most proximal the trailer hitch ball 5 and through the first and second yoke guides 20, 22, approximately three inches distal the position of the yoke end 12 and yoke cross brace 14 and in alignment with the pin apertures 36 through the first and second yoke guide receiver tubes 26, 31 when the yoke assembly 10 is retracted; these pin apertures 36 may receive pins 35 to secure the yoke assembly 10 when retracted during transit of the trailer and when extended for positioning and connecting the trailer hitch assembly 2 with the trailer hitch ball 5. The described fixing of the position of the yoke assembly 10, when extended, will keep the yoke from retracting and force the yoke cross brace to rest in front of the lock down tongue of a trailer hitch assembly 2. Different size/style trailer hitch ball 5 can be accommodated by placement of the first and second yoke guide receiver tubes 26, 31 and by adjustment of the length of the first and second yoke guides 20, 22.

Figure 20:
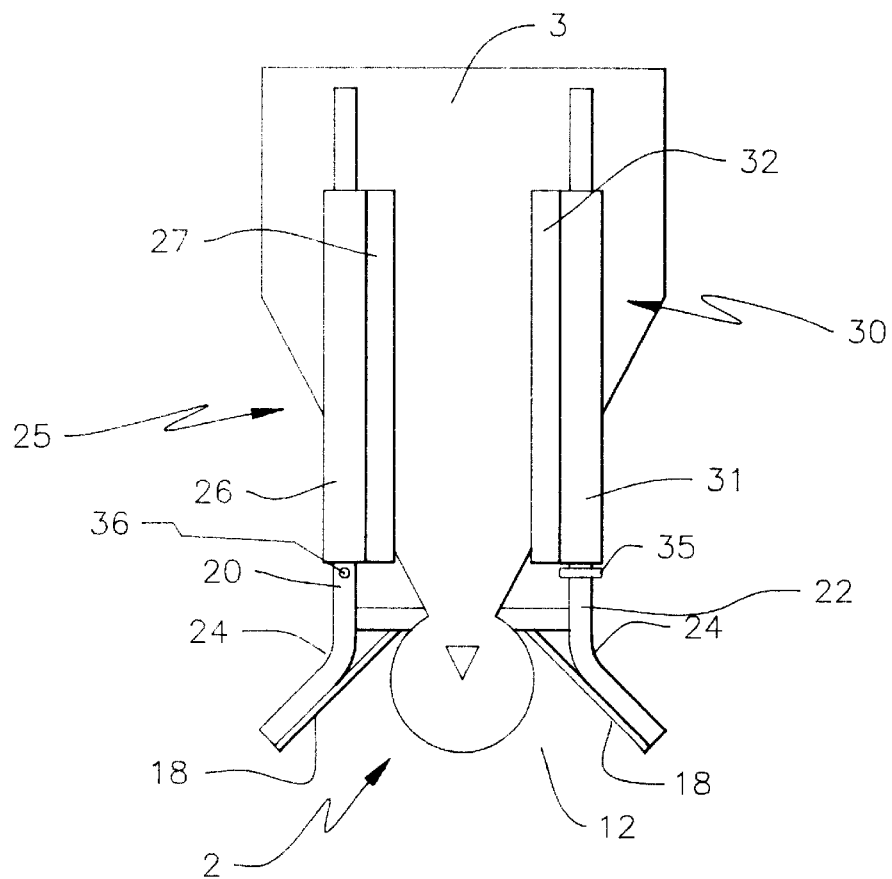
FIG. 20 is a top plan view of an additional alternative embodiment for recreational vehicle trailer hitches showing an embodiment of the retractable trailer hitch guide with the yoke assembly extended for receiving and guiding a trailer hitch ball for connection with an R.V. trailer hitch.
Figure 21:
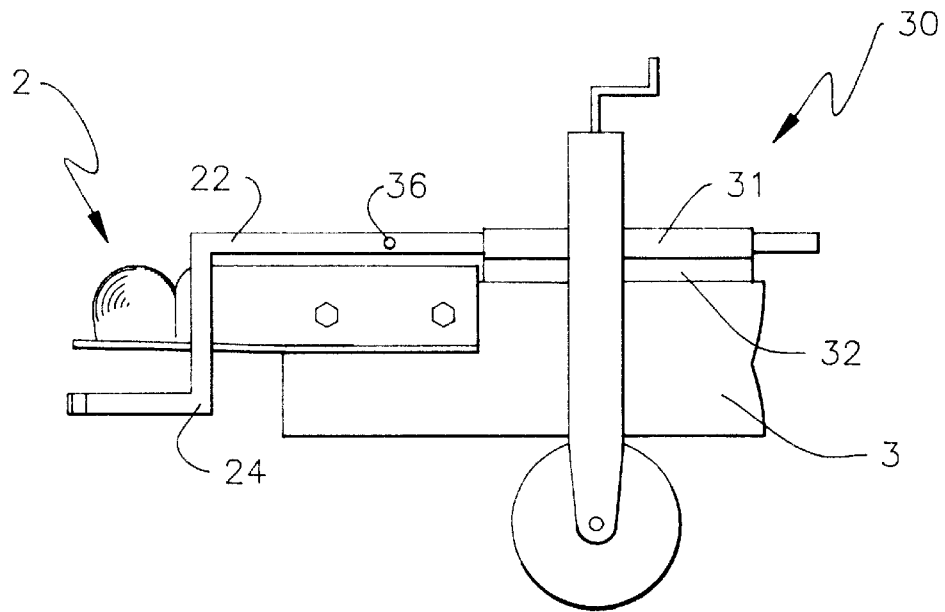
FIG. 21 is a side elevation of the additional alternative embodiment for recreational vehicle trailer hitches.
Figure 22:
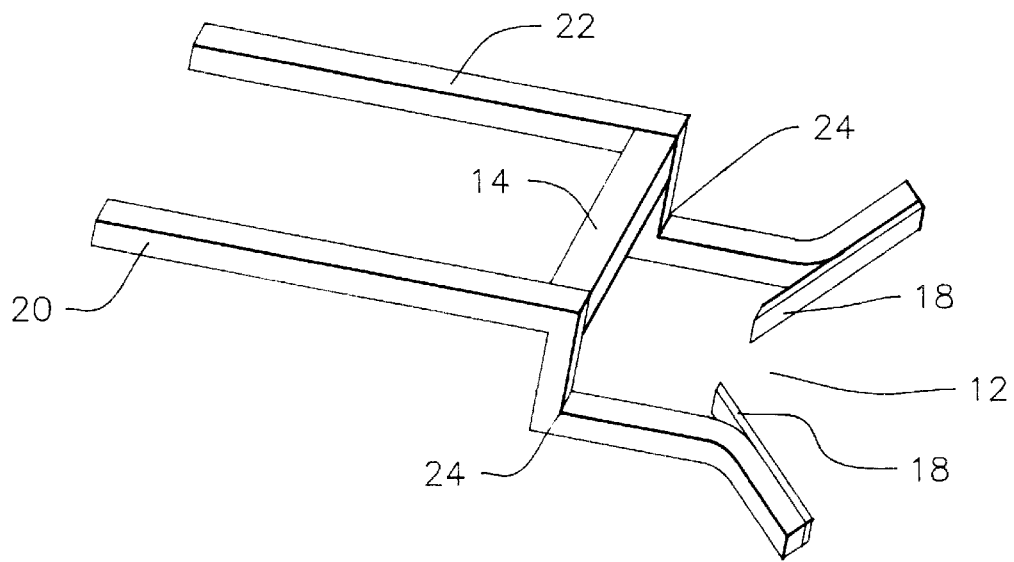
FIG. 22 is a perspective view of the additional alternative yoke assembly.

An additional alternative embodiment directed to recreational vehicle trailer hitches is depicted in FIGS. 20, 21 and 22.

While a preferred embodiment of the present invention has been shown and described, it will be apparent to those skilled in the art that many changes and modifications may be made without departing from the invention in its broader aspects. The appended claims are therefore intended to cover all such changes and modifications as fall within the true spirit and scope of the invention.

What is claimed is:

1. A retractable trailer hitch guide comprising:
   a. at least one side plate assembly composed of a first and second side plate; the first and second side plate being composed of a first and second side; a first and second yoke guide receiver tube being affixed by means respectively to the first and second side plate;
   b. a yoke assembly which is composed of a yoke end; a first and second yoke guide which are joined by a bracing means, affixed by means to each of the first and second yoke guides; the first and second yoke guides are sized and received respectively into the first and second yoke guide receiver tubes;
   c. the first and second side plates are adapted to be fixed to a tongue in an orientation which causes the yoke end to intercept and guide a trailer hitch ball for connection with a trailer hitch assembly.

2. A retractable trailer hitch guide according to claim 1 wherein:
   a. the yoke assembly is extended from the first and second yoke guide receiver tubes and fixed into the extended position by means thereby positioned to receive and guide the trailer hitch ball for connection with the trailer hitch assembly; the yoke assembly is retracted by insertion of the first and second yoke guides into the first and second yoke guide receiver tubes, and fixed into the retracted position by means, during transit of a trailer.

3. A retractable trailer hitch guide according to claim 2 wherein:
   a. the bracing means is provided for by a yoke cross brace affixed by welding;
   b. pin apertures formed through the first and second yoke guides and first and second yoke guide receiver tubes; the means fixing the yoke assembly into the extended and retracted positions provided by one or more pins received through the pin apertures.

4. A retractable trailer hitch guide according to claim 3 wherein:
   a. the first and second yoke guides are formed of square cross-section mild steel; each of the first and second yoke guides is formed with a bend so that the joining of the first and second yoke guide with the yoke cross brace forming at the yoke end a vee shape thereby adapted to receive and guide the trailer hitch ball for connection to the trailer hitch assembly;
   b. yoke face plates affixed by means to the portion of the first and second yoke guides forming the vee at the yoke end which thereby is adapted to contact the trailer hitch ball; the yoke face plates fixed by means to the yoke cross brace.

5. A retractable trailer hitch guide according to claim 4 wherein:
   a. the yoke assembly is extended and retracted manually.

6. A retractable trailer hitch guide according to claim 4 wherein:
   a. the yoke assembly is extended and retracted with power operated actuator means having actuator control and power sources.

7. A retractable trailer hitch guide comprising:
   a. a plate assembly composed of a plate to which at least one yoke guide receiver tube is affixed by means;
   b. a yoke assembly has a yoke end comprised of at least a pair of yoke arms forming a vee shape and at least one yoke guide which positions the yoke assembly;
   c. the shape of the yoke assembly is accomplished by a metal forming process; one or more of the yoke arms is formed by form bending; one or more of the yoke arms is affixed by means to the yoke assembly;
   d. the at least one yoke guide is sized and received respectively into the at least one yoke guide receiver tube;

e. the plate assembly is adapted to be affixed by means to a trailer hitch tongue in an orientation which causes the yoke end to intercept and guide a trailer hitch ball for connection with a trailer hitch assembly;

f. the yoke assembly is extended from the at least one yoke guide receiver tube when positioned to receive and guide a trailer hitch ball for connection with a trailer hitch assembly, and fixed into the extended position by means;

g. the yoke assembly is retracted by insertion of the at least one yoke guide into the at least one yoke guide receiver tube, during transit of a trailer, and fixed into the retracted position by means.

8. A retractable trailer hitch guide according to claim 7 wherein:

a. the plate assembly is affixed by the trailer hitch tongue by bolting;

b. the at least one yoke guide receiver tube is affixed to the plate by welding;

c. pin apertures are formed through the at least one yoke guide and the at least one yoke guide receiver tubes; the means fixing the yoke assembly into the extended and retracted positions is provided by one or more pins received through the pin apertures through the at least one yoke guide.

9. A retractable trailer hitch guide according to claim 8 wherein:

a. extending and retracting the yoke assembly is by manual positioning.

10. A retractable trailer hitch guide according to claim 8 wherein:

a. extending and retracting the yoke assembly is by actuator with actuator control and power sources.

11. A retractable trailer hitch guide comprising:

a. a plate assembly composed of a plate to which at least one yoke guide receiver tube is affixed by means;

b. a yoke assembly has a yoke end comprised of at least a pair of yoke arms forming a vee shape and at least one yoke guide which positions the yoke assembly;

c. the shape of the yoke assembly is accomplished by a metal forming process; one or more of the yoke arms is formed by form bending; one or more of the yoke arms is affixed by means to the yoke assembly;

d. the at least one yoke guide is sized and received respectively into the at least one yoke guide receiver tube;

e. the plate assembly is adapted to be affixed by means to a trailer hitch tongue in an orientation which causes the yoke end to intercept and guide a trailer hitch ball for connection with a trailer hitch assembly;

f. the yoke assembly is extended from the at least one yoke guide receiver tube when positioned to receive and guide a trailer hitch ball for connection with a trailer hitch assembly, and fixed into the extended position by means;

g. the yoke assembly is retracted by insertion of the at least one yoke guide into the at least one yoke guide receiver tube, during transit of a trailer, and fixed into the retracted position by means.

12. A retractable trailer hitch guide according to claim 11 wherein:

a. the plate assembly is affixed by the trailer hitch tongue by bolting;

b. the at least one yoke guide receiver tube is affixed to the plate by welding;

c. pin apertures are formed through the at least one yoke guide and the at least one yoke guide receiver tubes; the means fixing the yoke assembly into the extended and retracted positions is provided by one or more pins received through the pin apertures through the at least one yoke guide.

13. A retractable trailer hitch guide according to claim 12 wherein:

a. extending and retracting the yoke assembly is by manual positioning.

14. A retractable trailer hitch guide according to claim 12 wherein:

a. extending and retracting the yoke assembly is by actuator with actuator control and power sources.

* * * * *